United States Patent
Wang et al.

(10) Patent No.: US 11,196,868 B2
(45) Date of Patent: Dec. 7, 2021

(54) AUDIO DATA PROCESSING METHOD, SERVER, CLIENT AND SERVER, AND STORAGE MEDIUM

(71) Applicant: TENCENT TECHNOLOGY (SHENZHEN) COMPANY LIMITED, Guangdong (CN)

(72) Inventors: Xin Liang Wang, Guangdong (CN); Bin Li, Guangdong (CN); Jing Cong Chen, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 223 days.

(21) Appl. No.: 15/764,737

(22) PCT Filed: Feb. 14, 2017

(86) PCT No.: PCT/CN2017/073483
§ 371 (c)(1),
(2) Date: Mar. 29, 2018

(87) PCT Pub. No.: WO2017/140235
PCT Pub. Date: Aug. 24, 2017

(65) Prior Publication Data
US 2018/0270360 A1     Sep. 20, 2018

(30) Foreign Application Priority Data
Feb. 18, 2016 (CN) .......................... 201610092373.5

(51) Int. Cl.
*H04M 3/56* (2006.01)
*H04L 29/06* (2006.01)

(52) U.S. Cl.
CPC .......... *H04M 3/568* (2013.01); *H04L 65/602* (2013.01); *H04L 65/604* (2013.01); *H04L 65/80* (2013.01); *H04M 2203/5072* (2013.01)

(58) Field of Classification Search
CPC ... H04L 65/403; H04L 65/601; H04L 65/102; H04L 65/1069; H04L 65/103;
(Continued)

(56) References Cited

U.S. PATENT DOCUMENTS 8,958,567 B2      2/2015   Tsingos et al.
2005/0286664 A1*  12/2005  Chen ................. H04L 65/4038
                                                           375/349
(Continued)

FOREIGN PATENT DOCUMENTS

CN      1984353 A          6/2007
CN      103327014 A *      9/2013  ............. G10L 19/00
(Continued)

OTHER PUBLICATIONS

Foreign Patent CN103327014A, Author: Liu et al. (Year: 2013).*
(Continued)

*Primary Examiner* — Tonia L Dollinger
*Assistant Examiner* — Mehulkumar J Shah
(74) *Attorney, Agent, or Firm* — Sughrue Mion, PLLC

(57) ABSTRACT

A server, system, and client are provided. The server receives audio data from one or more clients; receives an audio data request from a requesting client, and obtains, from the audio data request, a mixing manner of audio data requested by the requesting client; preprocesses audio data of a client of the one or more clients that corresponds to the audio data request using the obtained mixing manner; and sends the preprocessed audio data to the requesting client.

10 Claims, 10 Drawing Sheets

(58) Field of Classification Search
CPC ....... H04L 29/06; H04L 65/80; H04L 65/604; H04L 65/602; H04L 65/605; H04M 3/568; H04M 2203/5072; H04M 3/56
USPC .................................. 709/203, 201; 715/744
See application file for complete search history.

(56) References Cited

U.S. PATENT DOCUMENTS

| | | | |
|---|---|---|---|
| 2009/0113066 A1* | 4/2009 | Van Wie | H04L 65/605 709/231 |
| 2011/0016204 A1* | 1/2011 | Wiener | H04L 65/1093 709/224 |
| 2013/0010975 A1* | 1/2013 | Tsingos | G10L 21/003 381/63 |
| 2014/0173430 A1* | 6/2014 | Clavel | H04L 12/1822 715/716 |
| 2014/0185492 A1* | 7/2014 | Liu | H04M 3/00 370/260 |
| 2014/0341086 A1* | 11/2014 | Zhang | H04N 7/152 370/260 |
| 2014/0369528 A1* | 12/2014 | Ellner | H04M 3/568 381/119 |
| 2016/0196131 A1* | 7/2016 | Searle | H04L 29/06 717/173 |
| 2018/0295240 A1* | 10/2018 | Dickins | H04M 3/42221 |

FOREIGN PATENT DOCUMENTS

| | | |
|---|---|---|
| CN | 103327014 A | 9/2013 |
| CN | 104917671 A | 9/2015 |
| CN | 105721469 A | 6/2016 |
| CN | 105721469 B | 9/2019 |
| WO | 2014/085093 A1 | 6/2014 |

OTHER PUBLICATIONS

Written Opinion dated May 10, 2017 issued by the International Searching Authority in PCT/CN2017/073483.
Communication dated Apr. 30, 2019 issued by the State Intellectual Property Office of the P.R.C. in counterpart Application No. 201610092373.5.
International Search Report for PCT/CN2017/073483 dated May 10, 2017.
Communication dated Dec. 12, 2018 from the State Intellectual Property Office of the P.R.C. in counterpart Application No. 201610092373.5.
Communication dated Apr. 30, 2020, from the Intellectual Property of India in application No. 201837009178.
Communication dated Jun. 11, 2021 from the Intellectual Property Office of Malaysia in MY Application No. PI 2018700977.

* cited by examiner

AUDIO DATA PROCESSING METHOD, SERVER, CLIENT AND SERVER, AND STORAGE MEDIUM

CROSS-REFERENCE TO RELATED APPLICATIONS

This application is a National Stage entry of International Application No. PCT/CN2017/073483 filed on Feb. 14, 2017, which claims priority from Chinese Application No. 2016100923735 filed on Feb. 18, 2016 in the State Intellectual Property Office of China, the entire contents of each of which are incorporated by reference in their entirety.

FIELD

The present disclosure relates to the audio technologies, and in particular, to an audio data processing method, server, client and system, and a storage medium.

BACKGROUND

In a multi-person conversation system, it is crucial to deal with mixing of multiple-channel voice data because multiple parties are involved. The related art mixing manner includes client mixing and server mixing.

Client mixing means that decoding and mixing operations are performed on multi-channel voice data at a client. This client mixing manner requires a high bandwidth and a high processing capability of the client.

Server mixing means that the client decodes and plays only single-channel voice data, and a communications server performs decoding, mixing, and encoding operations on voice data of multiple clients. This server mixing manner requires low bandwidth and low processing capability on the client. However, because the voice data is encoded and decoded once, the voice data is easily distorted and delayed.

Various users select, according to their own needs, corresponding client or server mixing manners to mix the voice data. In this way, it is difficult for the users using different mixing manners to converse in a same conversation system.

SUMMARY

It is an aspect to provide an audio data processing method, server, client and system, and a storage medium that can be compatible with different mixing manners in order to resolve a technical problem in a related art technology that it is difficult for users using different mixing manners to converse in a same conversation system.

According to an aspect of one or more exemplary embodiments, there is provided a method comprising receiving audio data from one or more clients; receiving an audio data request from a requesting client, and obtaining, from the audio data request, a mixing manner of audio data requested by the requesting client; preprocessing audio data of a client of the one or more clients that corresponds to the audio data request using the obtained mixing manner; and sending the preprocessed audio data to the requesting client.

According to another aspect of one or more exemplary embodiments, there is provided a server comprising at least one microprocessor configured to receive audio data from one or more clients; receive an audio data request from a requesting client, and obtain, from the audio data request, a mixing manner of audio data requested by the requesting client; preprocess audio data of a client of the one or more clients that corresponds to the audio data request using the obtained mixing manner; and send the preprocessed audio data to the requesting client.

According to another aspect of one or more exemplary embodiments, there is provided a system comprising a plurality of clients; and a server comprising at least one microprocessor configured to receive audio data from one or more clients; receive an audio data request from a requesting client, and obtain, from the audio data request, a mixing manner of audio data requested by the requesting client; preprocess audio data of a client of the one or more clients that corresponds to the audio data request using the obtained mixing manner; and send the preprocessed audio data to the requesting client, wherein the audio data is received from the plurality of clients.

According to another aspect of one or more exemplary embodiments, there is provided a method comprising receiving remote audio data, the remote audio data comprising a client identifier of a client that indicates where the remote audio data is from; obtaining the client identifier from the remote audio data, and determining a mixing manner of the received remote audio data according to the client identifier; and processing the remote audio data according to the obtained mixing manner.

According to another aspect of one or more exemplary embodiments, there is provided a client comprising at least one microprocessor configured to receive remote audio data, the remote audio data comprising a client identifier of a client that indicates where the remote audio data is from; obtain the client identifier from the remote audio data, and determine a mixing manner of the received remote audio data according to the client identifier; and process the remote audio data according to the obtained mixing manner.

According to another aspect of one or more exemplary embodiments, there is provided a system comprising at least one server; and a plurality of clients, each comprising at least one microprocessor configured to receive remote audio data, the remote audio data comprising a client identifier of a client that indicates where the remote audio data is from; obtain the client identifier from the remote audio data, and determine a mixing manner of the received remote audio data according to the client identifier; and process the remote audio data according to the obtained mixing manner, wherein the plurality of clients receive the remote audio data from the at least one server.

According to another aspect of one or more exemplary embodiments, there is provided a server comprising a processor and a memory, the processor storing executable instructions configured to cause the processor to perform the following operations receiving audio data from one or more clients; receiving an audio data request from a requesting client, and obtaining, from the audio data request, a mixing manner of audio data requested by the requesting client; preprocessing audio data of a client of the one or more clients that corresponds to the audio data request using the obtained mixing manner; and sending the preprocessed audio data to the requesting client.

According to another aspect of one or more exemplary embodiments, there is provided a client comprising a processor and a memory, the processor storing executable instructions configured to cause the processor to perform the following operations receive remote audio data, the remote audio data comprising a client identifier of a client that indicates where the remote audio data is from; obtain the client identifier from the remote audio data, and determine a mixing manner of the received remote audio data according to the client identifier; and process the remote audio data according to the obtained mixing manner.

According to another aspect of one or more exemplary embodiments, there is provided a non-transitory computer readable storage medium, storing executable instructions which, when executed by a computer, perform a method comprising receiving audio data from one or more clients; receiving an audio data request from a requesting client, and obtaining, from the audio data request, a mixing manner of audio data requested by the requesting client; preprocessing audio data of a client of the one or more clients that corresponds to the audio data request using the obtained mixing manner; and sending the preprocessed audio data to the requesting client.

According to another aspect of one or more exemplary embodiments, there is provided a non-transitory computer readable storage medium, storing executable instructions which, when executed by a computer, perform a method comprising receiving remote audio data, the remote audio data comprising a client identifier of a client that indicates where the remote audio data is from; obtaining the client identifier from the remote audio data, and determining a mixing manner of the received remote audio data according to the client identifier; and processing the remote audio data according to the obtained mixing manner.

BRIEF DESCRIPTION OF THE DRAWINGS

Exemplary embodiments will be described with reference to the accompanying drawings, in which.

DETAILED DESCRIPTION

Figure 1:
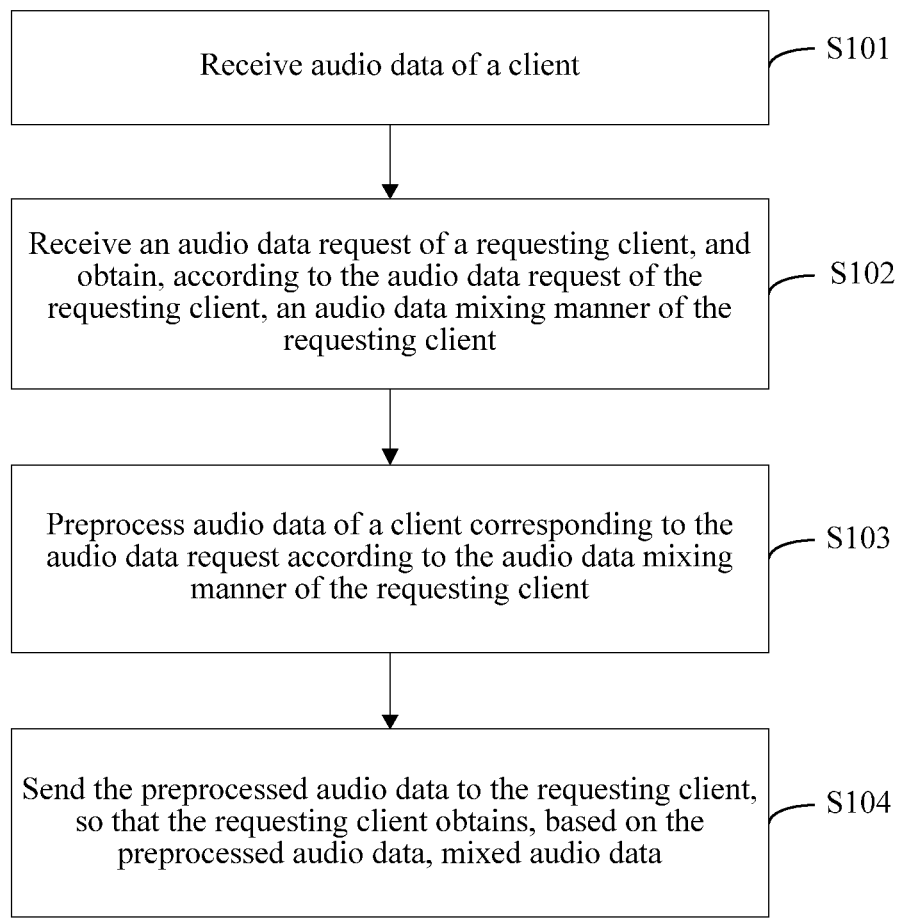
FIG. 1 is a flowchart of an audio data processing method according to an exemplary embodiment.

Referring to the drawings, the same components are represented by the same component symbols. The principle of the present disclosure is illustrated by an application in a suitable computing environment. The following description is based on the illustrated specific exemplary embodiments, which should not be construed as limiting other specific exemplary embodiments that are not discussed in detail herein.

In the description below, the specific exemplary embodiments will be described with reference to steps and signs of operations that are performed by one or more computers, unless indicated otherwise. Therefore, it will be understood that such steps and operations, which are at times referred to as being executed by a computer, include the manipulation by a processing unit, such as a central processing unit (CPU) or microprocessor, of the computer of electrical signals representing data in a structured form. This manipulation transforms the data or maintains it at locations in the memory system of the computer, which reconfigures or otherwise alters the operation of the computer in a manner well understood by persons skilled in the art. The data structures where data is maintained are physical locations of the memory that have particular properties defined by the format of the data. However, while the principle of the exemplary embodiments is being described in the foregoing text, it is not meant to be limiting as persons skilled in the art will appreciate that the various steps and operations described hereinafter may also be implemented in hardware.

A decoding apparatus of exemplary embodiments may be implemented by using various electronic devices. The electronic devices include, but are not limited to, a personal computer, a server computer, a handheld or laptop device, a mobile device (for example, a mobile phone, a personal digital assistant (PDA), or a media player), a multiprocessor system, a consumer electronic device, a small-size computer, a mainframe, a distributed computing environment including any of the foregoing systems or devices, and the like.

Particularly, the electronic device is an audio data processing server or a mobile device running an audio data processing client to implement compatible processing of audio data of different mixing manners (for example, a server mixing manner and a mobile device mixing manner).

In the audio data processing method, server and system according to the exemplary embodiments, compared with the related art technology, mixing is performed according to the audio data mixing manner of the requesting client, and audio data of different mixing manners may thus be compatible. In addition, in the audio data processing method, server and system according to the exemplary embodiments, the audio data mixing manner is identified by using a client identifier. Therefore, a playing operation can be performed on audio data of different mixing manners, resolving the technical problem that in the related art technology, it is difficult for users using different mixing manners to converse in a same conversation system. In other words, the playing operation can be performed on audio data of different mixing manners thereby making it more easy for users using different mixing manners to converse in the same conversation system.

Referring to FIG. 1, FIG. 1 is a flowchart of an audio data processing method according to an exemplary embodiment. The audio data processing method may be implemented by the foregoing electronic device. For example, the method may be implemented by the audio data processing server. The audio data processing method includes:

Step S101: Receive audio data of a client.

Step S102: Receive an audio data request of a requesting client, and obtain, according to the audio data request of the requesting client, an audio data mixing manner of the requesting client.

Step S103: Preprocess audio data of a client corresponding to the audio data request according to the audio data mixing manner of the requesting client.

Step S104: Send the preprocessed audio data to the requesting client, so that the requesting client obtains, based on the preprocessed audio data, mixed audio data.

A specific flow of the steps of the audio data processing method according to this exemplary embodiment is described in detail below.

In step S101, the audio data processing server may receive audio data of a client. The audio data may be voice data, music data, or the like that is sent by the client to another client. Subsequently, step S102 is performed.

In step S102, the audio data processing server receives the audio data request of the requesting client. The requesting client is a client that sends the audio data request to an electronic device (the audio data processing method is implemented by the electronic device) to request to receive the voice data or music data of another client. The audio data request is a request for requesting to receive the voice data or music data of another client. The electronic device that receives the audio data sent by the client and the audio data request, for example, the audio data processing server, obtains the audio data mixing manner of the requesting client according to the audio data request of the requesting client. The audio data mixing manner herein may include client mixing, server mixing, and the like. Subsequently, step S103 is performed.

According to descriptions of step S101 and step S102, step S101 and step S102 alternatively may be described in such a manner:

Step S101: Receive audio data of at least two clients. In other words, the client in Step S101 may be a single client as described in the example above, or may be a plurality of clients.

Step S102: Receive an audio data request of a client (the client sending the audio data request is a requesting client and may be a client of the at least two clients described in step S101, or may be a client different from the at least two clients described in step S101), and obtain, according to the audio data request of the requesting client, a mixing manner (referred to as an audio data type for short) of audio data requested by the requesting client.

In step S103, the audio data processing server performs mixing preprocessing on the audio data of the client corresponding to the audio data request (the client corresponding to the audio data request is a client whose audio data is indicated by using the audio data request) according to the audio data mixing manner of the requesting client obtained in step S102, so that the client sending the audio data request can normally play the audio data on which mixing preprocessing has been performed. Subsequently, step S104 is performed.

In step S104, the audio data processing server sends the audio data on which mixing preprocessing is performed in step S103 to the requesting client, so that the requesting client obtains mixed audio data. That is, the requesting client obtains the corresponding audio data on which mixing preprocessing is performed, then obtains the corresponding mixed audio data in a corresponding audio extraction manner, and at last, performs a playing operation on the obtained mixed audio data.

In this way, an audio data processing process of the audio data processing method according to this exemplary embodiment is completed.

In the audio data processing method according to this exemplary embodiment, mixing is performed according to the audio data mixing manner of the requesting client, and audio data of different mixing manners can be compatible.

Figure 2:
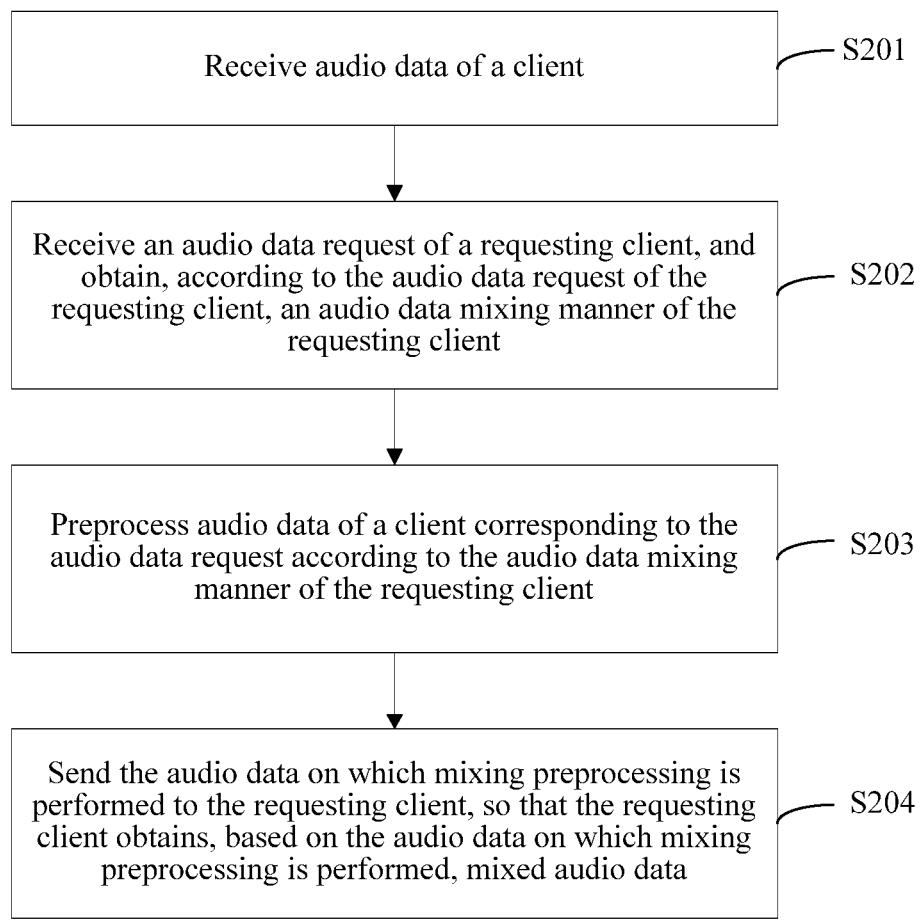
FIG. 2 is a flowchart of an audio data processing method according to an exemplary embodiment.

Referring to FIG. 2, FIG. 2 is a flowchart of an audio data processing method according to an exemplary embodiment. The audio data processing method according to this exemplary embodiment may be implemented by using the foregoing electronic device, and in particular, the audio data processing server. The audio data processing method includes:

Step S201: Receive audio data of a client.

Step S202: Receive an audio data request of a requesting client, and obtain, according to the audio data request of the requesting client, an audio data mixing manner of the requesting client.

Step S203: Preprocess audio data of a client corresponding to the audio data request according to the audio data mixing manner of the requesting client.

Step S204: Send the audio data on which mixing preprocessing is performed to the requesting client, so that the requesting client obtains, based on the audio data on which mixing preprocessing is performed, mixed audio data.

A specific flow of the steps of the audio data processing method according to this exemplary embodiment is described in detail below.

In step S201, the audio data processing server receives audio data of a client. The audio data may be voice data, music data, or the like that is sent by the client to another client via the audio data processing server. Subsequently, step S202 is performed.

In step S202, the audio data processing server receives the audio data request of the requesting client. The requesting client is a client that sends the audio data request to request to receive the voice data or music data of another client. The audio data request is a request for requesting to receive the voice data or music data of another client. The electronic device that receives the audio data sent by the client and the audio data request, for example, the audio data processing server, obtains the audio data mixing manner of the requesting client according to the audio data request of the requesting client. The audio data mixing manner herein may include a client mixing, server mixing, and the like.

The audio data mixing manner herein includes client mixing and server mixing. Client mixing denotes that a client receiving the audio data serves as an audio data processing client, and the audio data processing client performs a mixing operation on multiple pieces of audio data, and then performs a playing operation on the audio data on which the mixing operation is performed. Server mixing denotes that the audio data processing server performs a mixing operation on multiple pieces of audio data, and then sends the audio data on which the mixing operation is performed to the audio data processing client. The audio data processing client only serves as a client playing the audio data and performs the playing operation. Subsequently, step S203 is performed.

In step S203, the audio data processing server preprocesses the audio data of the client corresponding to the audio data request according to the audio data mixing manner of the requesting client obtained in step S202.

Specifically:

The audio data processing server directly performs only a collection operation on the audio data of the client corresponding to the audio data request if the audio data mixing manner is client mixing. The audio data is not processed after being collected.

Figure 3:
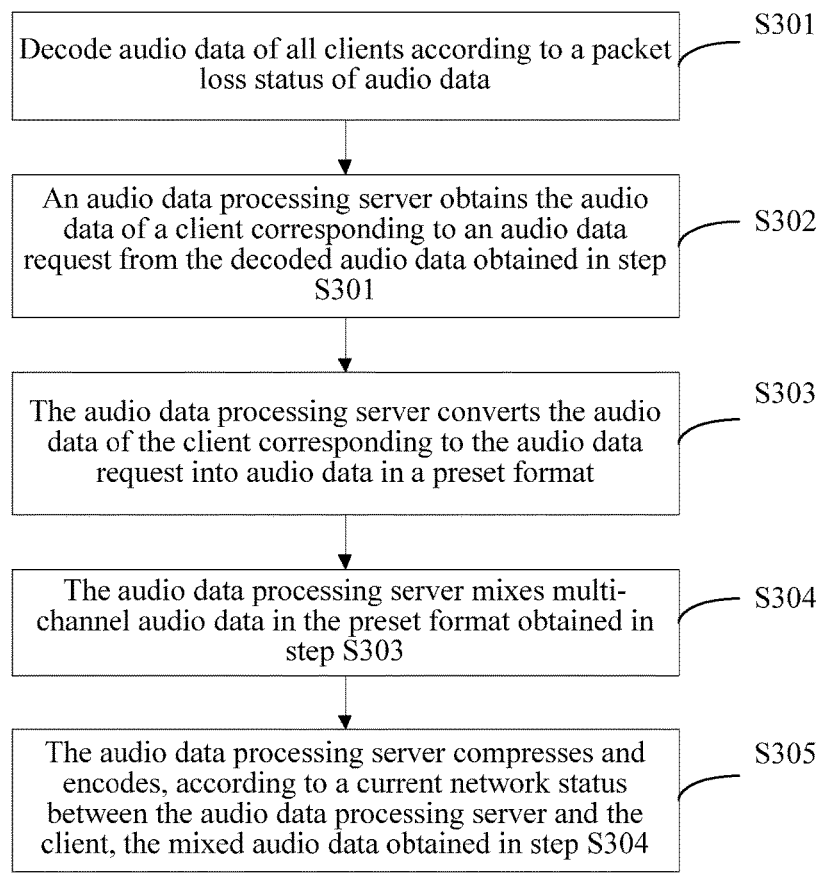
FIG. 3 is a flowchart of step S203 of the audio data processing method of FIG. 2.

The audio data processing server sequentially decodes, mixes, and encodes the audio data of the client corresponding to the audio data request if the audio data mixing manner is server mixing. For details, refer to FIG. 3. FIG. 3 is a flowchart of step S203 of an audio data processing method according to an exemplary embodiment. Step S203 includes:

Step S301: The audio data processing server decodes audio data of all clients according to a packet loss status of the audio data.

That is, after receiving an audio data bitstream, the audio data processing server determines the packet loss status of the audio data, and if no packet is lost, directly decodes the audio data by using a corresponding decoder to obtain the decoded audio data. If a packet is lost, the audio data processing server recovers a lost voice packet by using a forward error correction (FEC) redundancy packet, and then decodes, by using a corresponding decoder, the audio data obtained after recovery, to obtain the decoded audio data. If a lost packet cannot be recovered, the audio data processing server directly calculates a voice packet before packet loss by using a packet loss compensation algorithm, and then decodes, by using a corresponding decoder, the audio data obtained through calculation. Subsequently, step S302 is performed.

Step S302: The audio data processing server obtains the audio data of the client corresponding to the audio data request from the decoded audio data obtained in step S301.

The audio data processing server may store the audio data received from all the clients in a data buffer for calling at any time. In this way, the audio data processing server may obtain the audio data of the corresponding client according to the audio data request. Subsequently, step S303 is performed.

Step S303: The audio data processing server converts the audio data of the client corresponding to the audio data request into audio data in a preset format. Because a format of audio data of each client may not be consistent with that required by an encoder (for example, a format of audio data that the encoder supports encoding), formats of all audio data are uniformly converted into the preset format herein, so as to perform an encoding operation on the audio data subsequently. Subsequently, step S304 is performed.

Step S304: The audio data processing server mixes the multi-channel audio data (the audio data from the client corresponding to the audio data request) in the preset format obtained in step S303 to generate single-channel mixed audio data. Subsequently, step S305 is performed.

Step S305: The audio data processing server compresses and encodes, according to a current network status between the audio data processing server and the client, the mixed audio data obtained in step S304. For example, the audio data processing server performs FEC encoding on the mixed audio data according to a network packet loss status and a network delay and jitter status to generate a corresponding audio data encoding packet, so as to perform network security transmission on the audio data encoding packet. Subsequently, step S204 is performed after the transmission is completed.

Returning to step S204, the audio data processing server sends the audio data encoding packet obtained in step S203 (i.e., steps S301-S305) to the requesting client, so that the requesting client obtains the mixed audio data.

If the audio data mixing manner of the requesting client is client mixing, the preprocessed audio data obtained by the requesting client is multi-channel audio data that is not mixed. In this case, the requesting client mixes the received multi-channel audio data and plays the mixed audio data.

If the audio data mixing manner of the requesting client is server mixing, the preprocessed audio data obtained by the requesting client is the audio data encoding packet and the requesting client may directly decode and play the audio data encoding packet.

In this way, an audio data processing process of the audio data processing method according to this exemplary embodiment is completed.

The audio data processing method according to this exemplary embodiment may further include the following steps: receiving, by the audio data processing server, a mixing manner conversion request of the requesting client, and setting the audio data mixing manner of the requesting client according to the mixing manner conversion request of the requesting client.

That is, the audio data processing server may convert the audio data mixing manner of the requesting client according to the mixing manner conversion request of the requesting client, for example, convert a requesting client using a client mixing manner into a requesting client using a server mixing manner.

In addition, in the audio data processing method according to this exemplary embodiment, the audio data may be encoded to perform network security transmission on the audio data, and the audio data mixing manner of the client may be switched in time according to the mixing manner conversion request of the requesting client, further improving transmission security and processing compatibility of audio data of different mixing manners.

Figure 4:
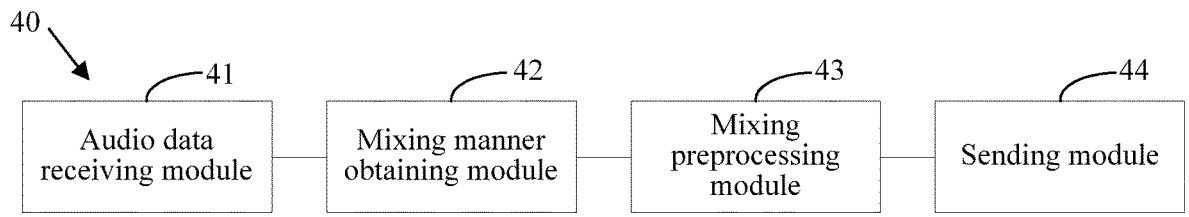
FIG. 4 is a schematic structural diagram of an audio data processing server according to an exemplary embodiment.

An exemplary embodiment further provides an audio data processing server. Referring to FIG. 4, FIG. 4 is a schematic structural diagram of an audio data processing server according to an exemplary embodiment. The audio data processing server according to this exemplary embodiment may be implemented by using descriptions of the foregoing audio data processing method. The audio data processing server 40 includes an audio data receiving module 41, a mixing manner obtaining module 42, a mixing preprocessing module 43, and a sending module 44.

The audio data receiving module 41 is configured to receive audio data of a client. The mixing manner obtaining module 42 is configured to receive an audio data request of a requesting client and obtain, according to the audio data request of the requesting client, an audio data mixing manner of the requesting client. The preprocessing module 43 is configured to preprocess audio data of a client corresponding to the audio data request according to the audio data mixing manner of the requesting client. The sending module 44 is configured to send the preprocessed audio data to the requesting client, so that the requesting client obtains mixed audio data.

When the audio data processing server 40 in this exemplary embodiment is used, first, the audio data receiving module 41 receives audio data of each client, and the audio data may be voice data, music data, or the like that is sent by the client to another client.

Subsequently, the mixing manner obtaining module 42 receives the audio data request of the requesting client. The requesting client is a client that requests to receive the voice data or music data of another client. The audio data request is a request for requesting to receive the voice data or music data of another client. Subsequently, the mixing manner obtaining module 42 obtains the audio data mixing manner of the requesting client according to the audio data request of the requesting client. The audio data mixing manner herein may include client mixing, server mixing, and the like.

Subsequently, the preprocessing module 43 preprocesses the audio data of the client corresponding to the audio data request according to the audio data mixing manner of the requesting client obtained by the mixing manner obtaining module 42, so that a corresponding client may normally play the preprocessed audio data.

Lastly, the sending module 44 sends the audio data preprocessed in the mixing preprocessing module 43 to the requesting client, so that the requesting client obtains mixed audio data. That is, the requesting client obtains the corresponding preprocessed audio data, then obtains, based on the preprocessed audio data, the corresponding mixed audio data in a corresponding audio extraction manner, and at last, performs a playing operation on the obtained mixed audio data.

In this way, an audio data processing process of the audio data processing server 40 according to this exemplary embodiment is completed.

In the audio data processing server according to this exemplary embodiment, mixing is performed according to the audio data mixing manner of the requesting client, and audio data of different mixing manners can be compatible.

Figure 5:
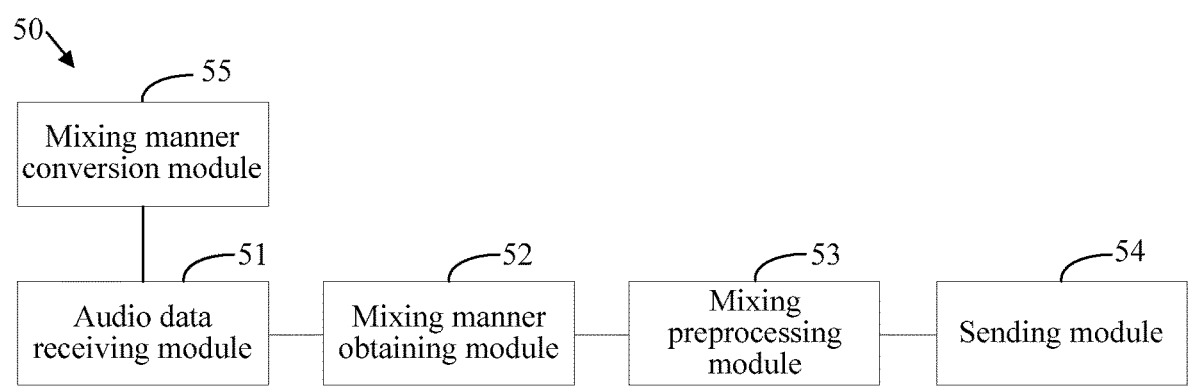
FIG. 5 is a schematic structural diagram of an audio data processing server according to an exemplary embodiment.

Referring to FIG. 5, FIG. 5 is a schematic structural diagram of an audio data processing server according to an exemplary embodiment. The audio data processing server according to this exemplary embodiment may be implemented based on the audio data processing method described above. The audio data processing server 50 includes an audio data receiving module 51, a mixing manner obtaining module 52, a mixing preprocessing module 53, a sending module 54, and a mixing manner conversion module 55.

The audio data receiving module 51 is configured to receive audio data of a client. The mixing manner obtaining module 52 is configured to receive an audio data request of a requesting client and obtain, according to the audio data request of the requesting client, an audio data mixing manner of the requesting client. The mixing preprocessing module 53 is configured to perform mixing preprocessing on audio data of a client corresponding to the audio data request according to the audio data mixing manner of the requesting client. The sending module 54 is configured to send the preprocessed audio data to the requesting client, so that the requesting client obtains, based on the mixed audio data, mixed audio data. The mixing manner conversion module 55 is configured to receive a mixing manner conversion request of the requesting client and set the audio data mixing manner of the requesting client according to the mixing manner conversion request of the requesting client.

Figure 6:
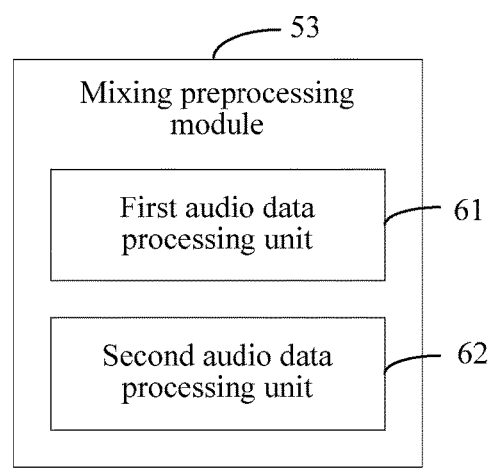
FIG. 6 is a schematic structural diagram of a preprocessing module of the audio data processing server of FIG. 5, according to an exemplary embodiment.

Referring to FIG. 6, FIG. 6 is a schematic structural diagram of a preprocessing module of an audio data processing server according to an exemplary embodiment. The mixing preprocessing module 53 includes a first audio data processing unit 61 and a second audio data processing unit 62.

The first audio data processing unit 61 is configured to collect the audio data of the client corresponding to the audio data request if the audio data mixing manner of the requesting client is client mixing. The second audio data processing unit 62 is configured to sequentially decode, mix, and encode the audio data of the client corresponding to the audio data request if the audio data mixing manner of the requesting client is server mixing.

Figure 7:
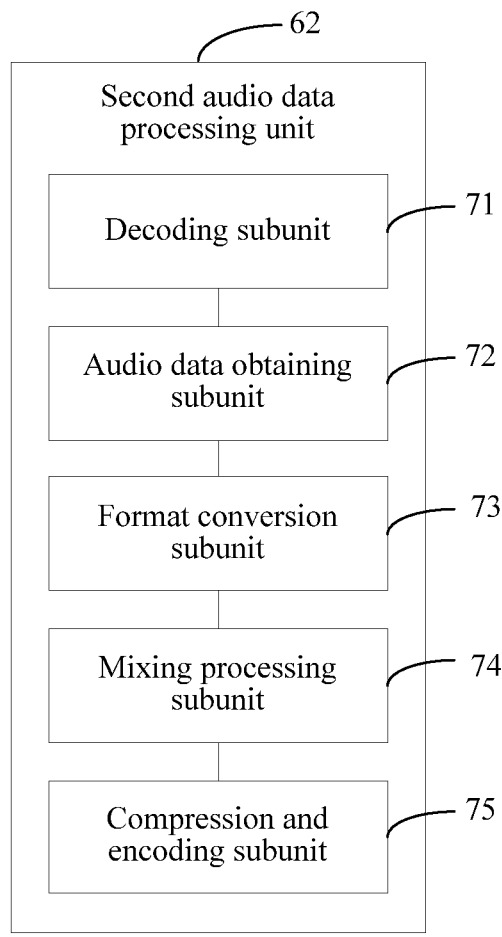
FIG. 7 is a schematic structural diagram of a second audio data processing unit of the preprocessing module of FIG. 6, according to an exemplary embodiment.

Referring to FIG. 7, FIG. 7 is a schematic structural diagram of a second audio data processing unit of a mixing preprocessing module of an audio data processing server according to an exemplary embodiment. The second audio data processing unit 62 includes a decoding subunit 71, an audio data obtaining subunit 72, a format conversion subunit 73, a mixing processing subunit 74, and a compression and encoding subunit 75.

The decoding subunit 71 is configured to decode audio data of all clients according to a packet loss status of the audio data. The audio data obtaining subunit 72 is configured to obtain the audio data of the client corresponding to the audio data request from the decoded audio data. The format conversion subunit 73 is configured to convert the audio data of the client corresponding to the audio data request into audio data in a preset format. The mixing processing subunit 74 is configured to mix the audio data in the preset format. The compression and encoding subunit 75 is configured to compress and encode the mixed audio data according to a current network status.

When the audio data processing server 50 in this exemplary embodiment is used, first, the audio data receiving module 51 receives audio data of each client, and the audio data may be voice data, music data, or the like that is sent by the client to another client.

Subsequently, the mixing manner obtaining module 52 receives the audio data request of the requesting client. The requesting client is a client that requests to receive the voice data or music data of another client. The audio data request is a request for requesting to receive the voice data or music data of another client. Subsequently, the mixing manner obtaining module 52 obtains the audio data mixing manner of the requesting client according to the audio data request of the requesting client.

The audio data mixing manner herein includes client mixing and server mixing. Client mixing denotes that an audio data processing client performs a mixing operation on multiple pieces of audio data and then performs a playing operation on the audio data on which the mixing operation is performed. Server mixing denotes that the audio data processing server performs a mixing operation on multiple pieces of audio data and then sends the audio data on which the mixing operation is performed to the audio data processing client, and the audio data processing client performs a playing operation.

Subsequently, the preprocessing module 53 preprocesses the audio data of the client corresponding to the audio data request according to the audio data mixing manner of the requesting client obtained by the mixing manner obtaining module 52.

Specifically, the first audio data processing unit 61 of the mixing preprocessing module 53 directly performs only a collection operation on the audio data of the client corresponding to the audio data request if the audio data mixing manner is client mixing. The audio data is not processed after being collected.

The second audio data processing unit 62 of the preprocessing module 53 sequentially decodes, mixes, and encodes the audio data of the client corresponding to the audio data request if the audio data mixing manner is server mixing. The process of decoding, mixing, and encoding is specifically as follows:

The decoding subunit 71 of the second audio data processing unit 62 decodes audio data of all clients according to a packet loss status of the audio data.

That is, after receiving an audio data bitstream, the decoding subunit 71 determines the packet loss status of the audio data, and if no packet is lost, directly decodes the audio data by using a corresponding decoder to obtain the decoded audio data. If a packet is lost, the decoding subunit 71 recovers a lost voice packet by using an FEC redundancy packet, and then decodes, by using a corresponding decoder, the audio data obtained after recovery, to obtain the decoded audio data. If a lost packet cannot be recovered, the decoding subunit 71 directly calculates a voice packet before packet loss by using a packet loss compensation algorithm, and then decodes, by using a corresponding decoder, the audio data obtained through calculation.

The audio data obtaining subunit 72 of the second audio data processing unit 62 obtains the audio data of the client corresponding to the audio data request from the decoded audio data obtained by the decoding subunit 71. Herein, the audio data processing server may store the audio data of all the clients in a data buffer for calling at any time. In this way, the audio data processing server may obtain the audio data of the corresponding client according to the audio data request.

The format conversion subunit 73 of the second audio data processing unit 62 converts the audio data of the client corresponding to the audio data request into audio data in a preset format. Because a format of audio data of each client may not be consistent with that required by an encoder, formats of all audio data are uniformly converted into the preset format herein, so as to perform an encoding operation on the audio data subsequently.

The mixing processing subunit 74 of the second audio data processing unit 62 mixes the multi-channel audio data in the preset format obtained by the format conversion subunit 73 to generate single-channel mixed audio data.

The compression and encoding subunit 75 of the second audio data processing unit 62 compresses and encodes, according to a current network status, the mixed audio data obtained by the mixing processing subunit 74. That is, the audio data processing server performs FEC encoding on the mixed audio data according to a network packet loss status and a network delay and jitter status to generate a corresponding audio data encoding packet, so as to perform network security transmission on the audio data.

Lastly, the mixing manner conversion module 54 sends the audio data encoding packet obtained by the sending module 53 to the requesting client, so that the requesting client obtains the mixed audio data.

If the audio data mixing manner of the requesting client is client mixing, the preprocessed audio data obtained by the requesting client is unprocessed multi-channel audio data. In this case, the requesting client mixes and plays the multi-channel audio data.

If the audio data mixing manner of the requesting client is server mixing, the preprocessed audio data obtained by the requesting client is the audio data encoding packet and the requesting client may directly decode and play the audio data encoding packet.

In this way, an audio data processing process of the audio data processing server 50 according to this exemplary embodiment is completed.

Optionally, the mixing manner conversion module 55 of the audio data processing server 50 according to this exemplary embodiment may further receive a mixing manner conversion request of the requesting client and set the audio data mixing manner of the requesting client according to the mixing manner conversion request of the requesting client.

That is, the mixing manner conversion module 55 may convert the audio data mixing manner of the requesting client according to the mixing manner conversion request of the requesting client, for example, convert a requesting client using a client mixing manner into a requesting client using a server mixing manner.

Based on the foregoing description, the audio data processing server according to this exemplary embodiment encodes the audio data to perform network security transmission on the audio data, and may further switch the audio data mixing manner of the client in time according to the mixing manner conversion request of the requesting client, further improving transmission security and processing compatibility of audio data of different mixing manners.

Figure 8:
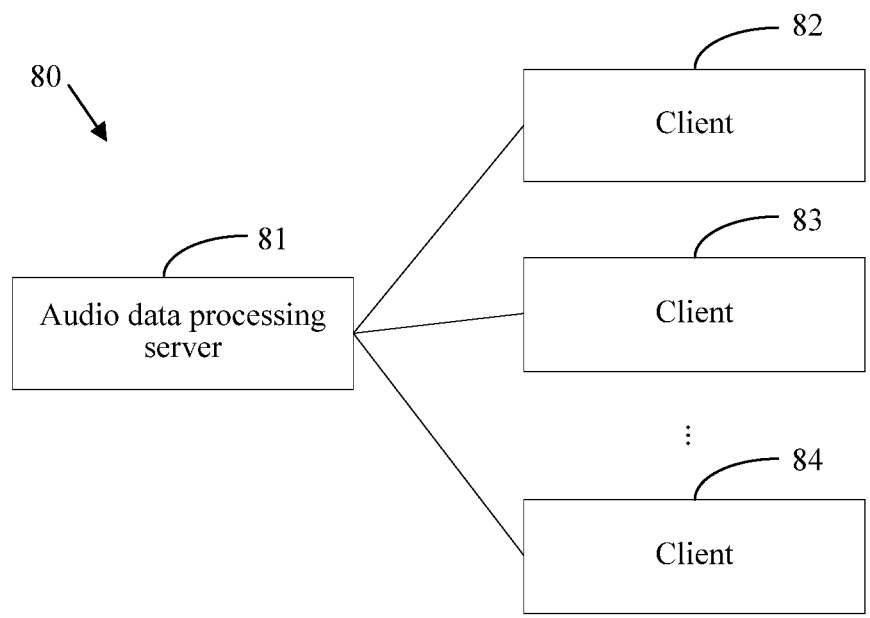
FIG. 8 is a schematic structural diagram of an audio data processing system according to an exemplary embodiment.

An exemplary embodiment further provides an audio data processing system. Referring to FIG. 8, FIG. 8 is a schematic structural diagram of an audio data processing system according to an exemplary embodiment. The audio data processing system 80 includes an audio data processing server 81 and a plurality of clients, for example, a client 82, a client 83, and a client 84.

A specific working principle of the audio data processing server 81 is the same as or similar to the descriptions of the foregoing audio data processing server according to the exemplary embodiments. For details, refer to related descriptions of the foregoing audio data processing server. The client in the audio data processing system 80 may be a client configured to perform audio data processing in the related art technology, for example, a conversation voice client.

In the audio data processing system according to this exemplary embodiment, mixing is performed according to the audio data mixing manner of the requesting client, and audio data of different mixing manners can be compatible.

A specific working principle of the audio data processing system according to this exemplary embodiment is described below by using a specific example. Referring to FIG. 8, the audio data processing system in FIG. 8 includes the audio data processing server 81 and the plurality of clients 82, 83, and 84. The plurality of clients 82, 83, and 84 may include, for example, a client that may perform a mixing operation on multi-channel audio data and a client that may perform only a playing operation on single-channel audio data.

A working flow of the audio data processing system according to this specific exemplary embodiment includes:

1. The audio data processing server 81 saves audio data mixing manners of all clients 82, 83, 84.

2. The audio data processing server 81 receives an audio data request of a client and obtains an audio data mixing manner of the client, for example, client mixing or server mixing.

3. The audio data processing server 81 obtains audio data of the corresponding client according to the audio data request of the client. For example, the client 82 may request audio data of the client 83 and the client 84. The audio data processing server obtains the audio data from the client 83 and the client 84 according to an audio data request of the client 82.

4. If an audio data mixing manner requested by the client 82 is client mixing, the audio data processing server 81 directly collects and encodes the audio data obtained from the client 83 and the client 84 and sends the encoded audio data to the client 82.

If the audio data mixing manner requested by the client 82 is server mixing, the audio data processing server 81 decodes, mixes, and encodes the audio data obtained from the client 83 and the client 84 and sends the encoded audio data to the client 82.

5. If the audio data mixing manner requested by the client 82 is client mixing, after receiving the encoded audio data, the client 82 decodes, mixed, and plays the encoded audio data.

If the audio data mixing manner requested by the client 82 is server mixing, after receiving the encoded audio data, the client 82 decodes and plays the encoded audio data.

6. The client 82 may further send a mixing manner conversion request to the audio data processing server 81 to convert the audio data mixing manner of the client 82 from client mixing into server mixing, or from server mixing into client mixing.

In this way, an audio data processing process of the audio data processing system 80 is completed.

Figure 9:
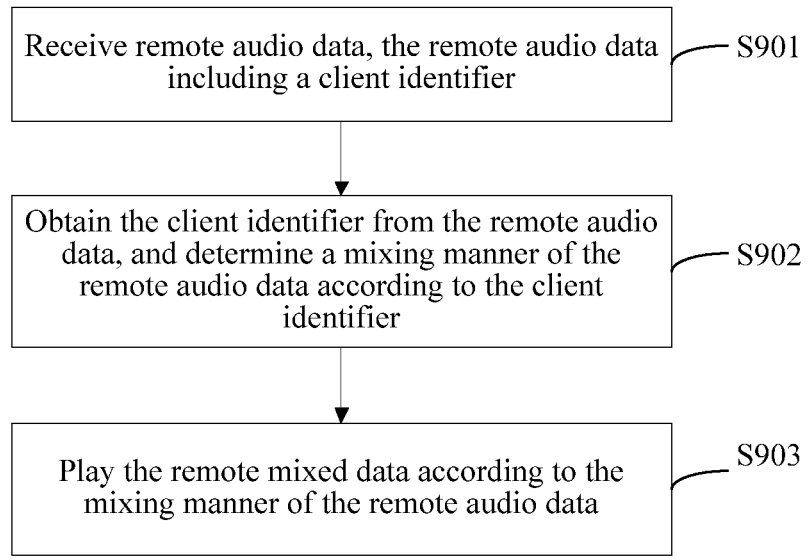
FIG. 9 is a flowchart of an audio data processing method according to an exemplary embodiment.

An exemplary embodiment further provides an audio data processing method. Referring to FIG. 9, FIG. 9 is a flowchart of an audio data processing method according to an exemplary embodiment. The audio data processing method according to this exemplary embodiment may be implemented by using the foregoing electronic device, and in particular, the audio data processing client. The audio data processing method includes:

Step S901: Receive remote audio data, the remote audio data including a client identifier.

Step S902: Obtain the client identifier from the remote audio data, and determine a mixing manner of the remote audio data according to the client identifier.

Step S903: Play the remote mixed data according to the mixing manner of the remote audio data.

A specific flow of the steps of the audio data processing method according to this exemplary embodiment is described below in detail.

In step S901, the audio data processing client receives the remote audio data that may be audio data transmitted from another audio data processing client or audio data processing server, and specifically, may be audio data that is from another audio data processing client and that is obtained according to an audio data request sent by the audio data processing client.

The remote audio data includes a client identifier. That is, when sending local audio data to another client or server, each audio data processing client sets a local client identifier on the sent local audio data, so that the client learns of a source of the audio data. For example, the audio data processing server processes the audio data and then sends the audio data to another client. A destination client identifier is set on the sent audio data, so that a destination client learns that audio data is processed by the audio data processing server. Subsequently, step S902 is performed.

In step S902, the audio data processing client obtains the client identifier from the remote audio data obtained in step S901, and determines a mixing manner of the remote audio data according to the client identifier. The mixing manner of the remote audio data herein may include client mixing, server mixing, and the like. Subsequently, step S903 is performed.

In step S903, the audio data processing client plays the remote mixed data according to the mixing manner of the remote audio data obtained in step S902. In this way, for remote audio data of different mixing manners, the audio data may be played in corresponding playing manners.

In this way, an audio data processing process of the audio data processing method according to this exemplary embodiment is completed.

In the audio data processing method according to this exemplary embodiment, the audio data mixing manner is identified by using the client identifier. Therefore, a playing operation may be performed on the audio data of different mixing manners.

Figure 10:
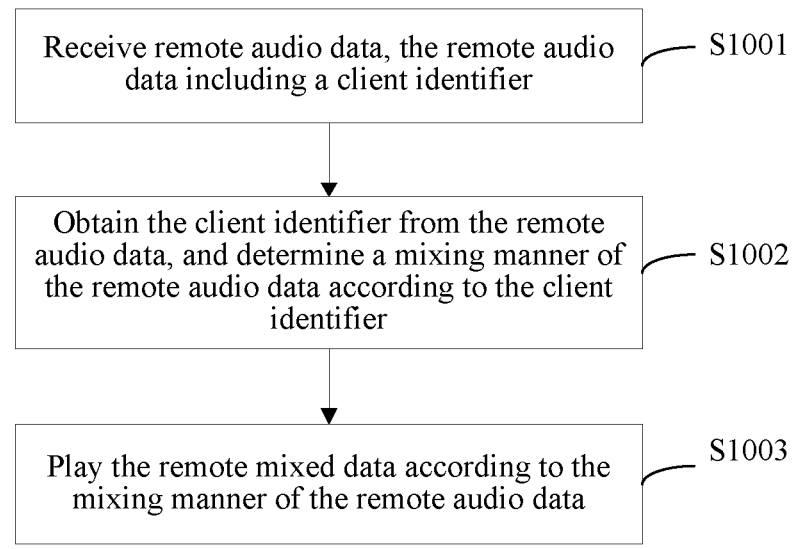
FIG. 10 is a flowchart of an audio data processing method according to an exemplary embodiment.

Referring to FIG. 10, FIG. 10 is a flowchart of an audio data processing method according to an exemplary embodiment. The audio data processing method according to this exemplary embodiment may be implemented by using the foregoing electronic device, and in particular, the audio data processing client. The audio data processing method includes:

Step S1001: Receive remote audio data, the remote audio data including a client identifier.

Step S1002: Obtain the client identifier from the remote audio data, and determine a mixing manner of the remote audio data according to the client identifier.

Step S1003: Play the remote mixed data according to the mixing manner of the remote audio data.

A specific flow of the steps of the audio data processing method according to this exemplary embodiment is described below in detail.

In step S1001, the audio data processing client receives the remote audio data that may be audio data transmitted from another audio data processing client or audio data processing server, and specifically, may be audio data that is from another audio data processing client and that is obtained according to an audio data request sent by the audio data processing client.

The remote audio data includes a client identifier. That is, when sending local audio data to another client or server, each audio data processing client sets a local client identifier on the sent local audio data, so that the client learns of a source of the audio data. For example, the audio data processing server processes the audio data and then sends the audio data to another client. A destination client identifier is set on the sent audio data, so that a destination client learns that audio data is processed by the audio data processing server. Therefore, if the mixing manner of the remote audio data is a client mixing manner, the client identifier is set by another audio data processing client, and if a mixing manner of the remote audio data is a server mixing manner, the client identifier is set by the audio data processing server. Subsequently, step S1002 is performed.

Figure 11:
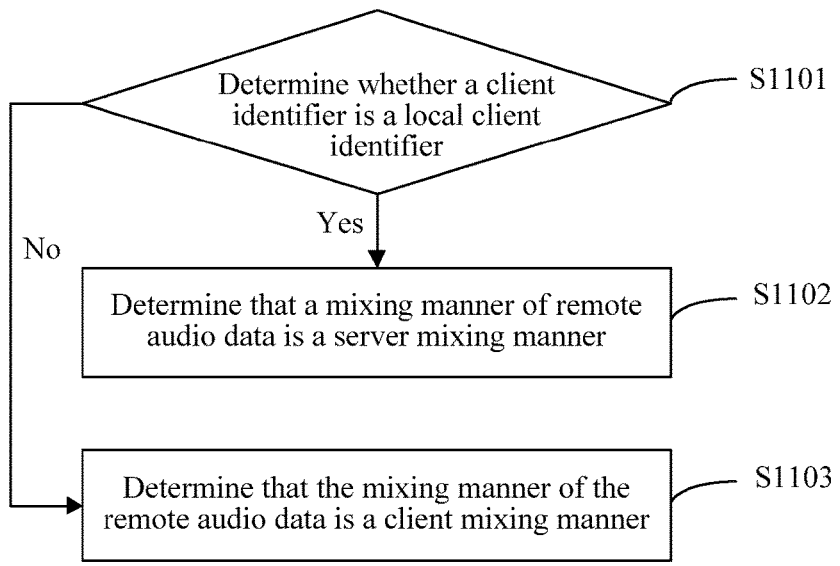
FIG. 11 is a flowchart of step S1002 of the audio data processing method of FIG. 10, according to an exemplary embodiment.

In step S1002, the audio data processing client obtains the client identifier from the remote audio data obtained in step S1001, and determines a mixing manner of the remote audio data according to the client identifier. The mixing manner of the remote audio data herein may include client mixing, server mixing, and the like. For specific steps of determining the mixing manner of the remote audio data, refer to FIG. 11. FIG. 11 is a flowchart of step S1002 of the audio data processing method according to an exemplary embodiment. Step S1002 includes:

Step S1101: The audio data processing client determines whether the client identifier is a local client identifier, and if the client identifier is a local client identifier, step S1102 is performed; and if the client identifier is not a local client identifier, step S1103 is performed.

Step S1102: Determine that the mixing manner of the remote audio data is the server mixing manner because that the client identifier is a local client identifier indicates that the remote audio data is processed by the audio data processing server.

Step S1103: Determine that the mixing manner of the remote audio data is the client mixing manner because that the client identifier is not a local client identifier indicates that the remote audio data is not processed by the audio data processing server. Subsequently, step S1003 is performed.

Figure 12:
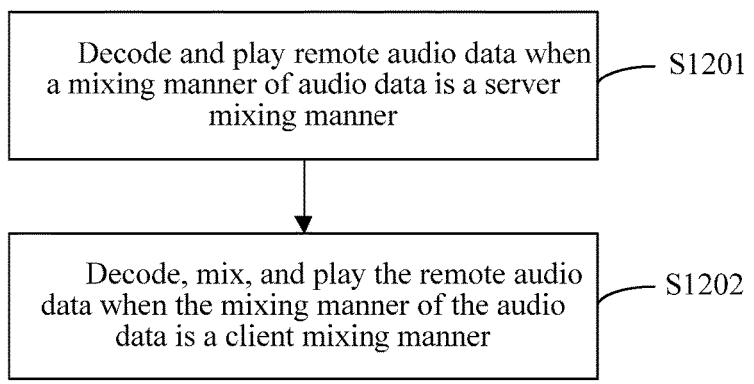
FIG. 12 is a flowchart of step S1003 of the audio data processing method of FIG. 10, according to an exemplary embodiment.

Returning to FIG. 10, in step S1003, the audio data processing client plays the remote mixed data according to the mixing manner of the remote audio data obtained in step S1002. In this way, for remote audio data of different mixing manners, the audio data may be played in corresponding playing manners. For details, refer to FIG. 12. FIG. 12 is a flowchart of step S1003 of an audio data processing method according to an exemplary embodiment. Step S1003 includes:

Step S1201: When the mixing manner of the audio data is the server mixing manner, because the audio data is mixed by the audio data processing server, the audio data processing client needs only to decode and play the remote audio data.

Step S1202: When the mixing manner of the audio data is the client mixing manner, because the audio data is not mixed, the audio data processing client needs to decode, mix, and play the multi-channel remote audio data.

In this way, an audio data processing process of the audio data processing method according to this exemplary embodiment is completed.

Based on the technical solutions described above in the exemplary embodiments, in the audio data processing method according to this exemplary embodiment, the audio data mixing manner is identified by the setting of the local client identifier, so as to perform a compatible playing operation on the audio data of two mixing manners, that is, server mixing and client mixing, further improving the processing compatibility of the audio data of different mixing manners.

Figure 13:
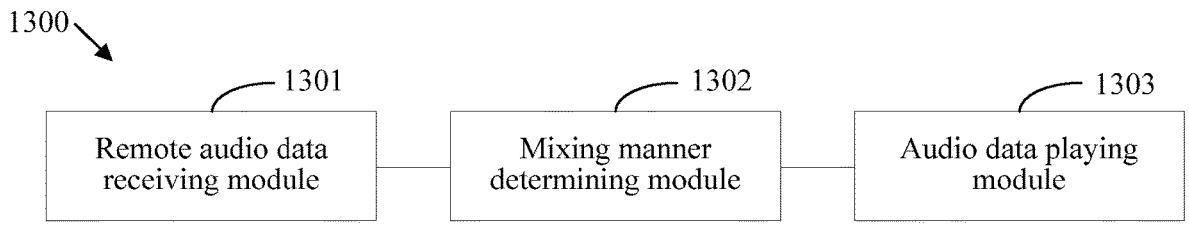
FIG. 13 is a schematic structural diagram of an audio data processing client according to an exemplary embodiment.

An exemplary embodiment further provides an audio data processing client. Referring to FIG. 13, FIG. 13 is a schematic structural diagram of an audio data processing client according to an exemplary embodiment. The audio data processing client according to this exemplary embodiment may be implemented by using the foregoing audio data processing method. The audio data processing client 1300 includes a remote audio data receiving module 1301, a mixing manner determining module 1302, and an audio data playing module 1303.

The remote audio data receiving module 1301 is configured to receive remote audio data, the remote audio data including a client identifier. The mixing manner determining module 1302 is configured to obtain the client identifier from the remote audio data and determine a mixing manner of the remote audio data according to the client identifier. The audio data playing module 1303 is configured to play the remote mixed data according to the mixing manner of the remote audio data.

When the audio data processing client 1300 according to this exemplary embodiment is used, first, the remote audio data receiving module 1301 receives the remote audio data that may be audio data transmitted from another audio data processing client or audio data processing server, and specifically, may be audio data that is from another audio data processing client and that is obtained according to an audio data request sent by the audio data processing client 1300.

The remote audio data includes a client identifier. That is, when sending local audio data to another client or server, each audio data processing client sets a local client identifier on the sent local audio data, so that the client learns of a source of the audio data. For example, the audio data processing server processes the audio data and then sends the audio data to another client. A destination client identifier is set on the sent audio data, so that a destination client learns that audio data is processed by the audio data processing server.

Subsequently, the mixing manner determining module 1302 obtains the client identifier from the remote audio data obtained by the remote audio data receiving module 1301 and determines the audio data mixing manner according to the client identifier. The mixing manner of the remote audio data herein may include client mixing, server mixing, and the like.

At last, the audio data playing module 1303 plays the remote audio data according to the mixing manner of the remote audio data obtained by the mixing manner determining module 1302. In this way, for remote audio data of different mixing manners, the audio data may be played in corresponding playing manners.

In this way, an audio data processing process of the audio data processing client 1300 according to this exemplary embodiment is completed.

In the audio data processing client according to this exemplary embodiment, the audio data mixing manner is identified by using the client identifier. Therefore, a playing operation may be performed on the audio data of different mixing manners.

Figure 14:
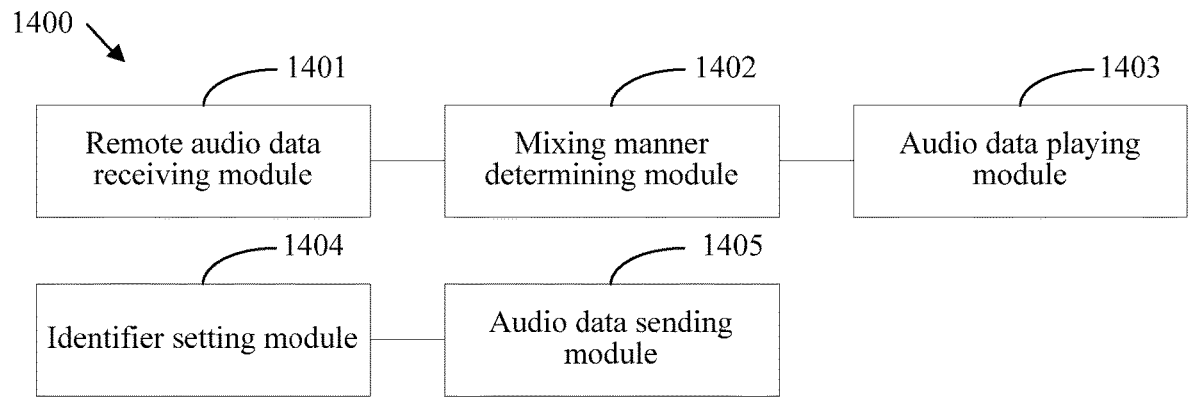
FIG. 14 is a schematic structural diagram of an audio data processing client according to an exemplary embodiment.

Referring to FIG. 14, FIG. 14 is a schematic structural diagram of an audio data processing client according to an exemplary embodiment. The audio data processing client according to this exemplary embodiment may be implemented by using the foregoing audio data processing method. The audio data processing client 1400 includes a remote audio data receiving module 1401, a mixing manner determining module 1402, an audio data playing module 1403, identifier setting module 1404, and an audio data sending module 1405.

The remote audio data receiving module 1401 is configured to receive remote audio data, the remote audio data including a client identifier. The mixing manner determining module 1402 is configured to obtain the client identifier from the remote audio data and determine a mixing manner of the remote audio data according to the client identifier. The audio data playing module 1403 is configured to play the remote mixed data according to the mixing manner of the remote audio data. The identifier setting module 1404 is configured to set a local client identifier on local audio data. The audio data sending module 1405 is configured to send the local audio data to another client or server.

Figure 15:
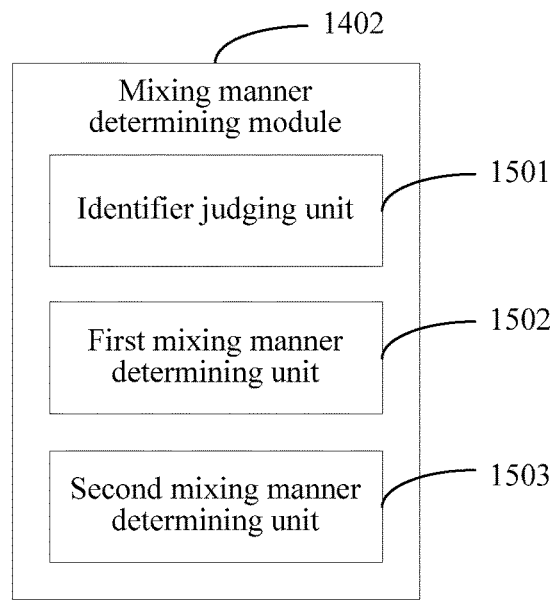
FIG. 15 is a schematic structural diagram of a mixing manner determining module of the audio data processing client of FIG. 14, according to an exemplary embodiment.

Referring to FIG. 15, FIG. 15 is a schematic structural diagram of a mixing manner determining module of an audio data processing client according to an exemplary embodiment. The mixing manner determining module 1402 includes an identifier judging unit 1501, a first mixing manner determining unit 1502, and a second mixing manner determining unit 1503.

The identifier judging unit 1501 is configured to determine whether the client identifier is a local client identifier. The first mixing manner determining unit 1502 is configured to determine that the mixing manner of the remote audio data is a server mixing manner if the client identifier is the local client identifier. The second mixing manner determining unit 1503 is configured to determine that the mixing manner of the remote audio data is a client mixing manner if the client identifier is a non-local client identifier.

Figure 16:
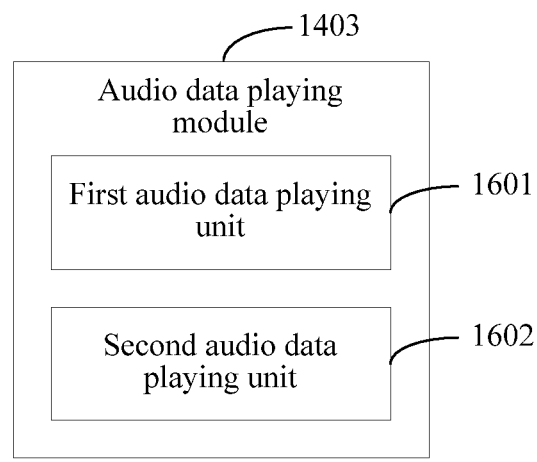
FIG. 16 is a schematic structural diagram of an audio data playing module of the audio data processing client of FIG. 14, according to an exemplary embodiment.

Referring to FIG. 16, FIG. 16 is a schematic structural diagram of an audio data playing module of an audio data processing client according to an exemplary embodiment. The audio data playing module 1403 includes a first audio data playing unit 1601 and a second audio data playing unit 1602.

The first audio data playing unit 1601 is configured to decode and play the remote audio data when the mixing manner of the audio data is the server mixing manner. The second audio data playing unit 1602 is configured to decode, mix, and play the remote audio data when the mixing manner of the audio data is the client mixing manner.

Returning to FIG. 14, when the audio data processing client 1400 according to this exemplary embodiment is used, first, the remote audio data receiving module 1401 receives the remote audio data that may be audio data transmitted from another audio data processing client or audio data processing server, and specifically, may be audio data that is from another audio data processing client and that is obtained according to an audio data request sent by the audio data processing client.

The remote audio data includes a client identifier. That is, when sending the local audio data to another client or server, the audio data sending module 1405 of each audio data processing client sets the local client identifier on the sent local audio data by using the identifier setting module 1404, so that the client learns of a source of the audio data. For example, the audio data processing server processes the audio data and then sends the audio data to another client. A destination client identifier is set on the sent audio data, so that a destination client learns that audio data is processed by the audio data processing server. Therefore, if the mixing manner of the remote audio data is the client mixing manner, the client identifier is set by another audio data processing client, and if the mixing manner of the remote audio data is the server mixing manner, the client identifier is set by the audio data processing server.

Subsequently, the mixing manner determining module 1402 obtains the client identifier from the remote audio data obtained by the remote audio data receiving module 1401 and determines the audio data mixing manner according to the client identifier. The mixing manner of the remote audio data herein may include client mixing, server mixing, and the like. A specific flow of determining the mixing manner of the remote audio data includes:

The identifier judging unit 1501 of the mixing manner determining module 1402 determines whether the client identifier is a local client identifier.

If the client identifier is a local client identifier, it indicates that the audio data is processed by the audio data processing server. Therefore, the first mixing manner determining unit 1502 of the mixing manner determining module 1401 determines that the mixing manner of the remote audio data is the server mixing manner.

If the client identifier is not a local client identifier, it indicates that the audio data is not processed by the audio data processing server. Therefore, the second mixing manner determining unit 1503 of the mixing manner determining module 1401 determines that the mixing manner of the remote audio data is the client mixing manner.

The audio data playing module 1403 then plays the remote audio data according to the mixing manner of the remote audio data obtained by the mixing manner determining module. In this way, for remote audio data of different mixing manners, the audio data may be played in corresponding playing manners. A specific flow includes:

When the mixing manner of the audio data is the server mixing manner, because the audio data is mixed by the audio data processing server, the first audio data playing unit 1601 of the audio data playing module 1403 needs to decode and play only the remote audio data.

When the mixing manner of the audio data is the client mixing manner, because the audio data is not mixed, the second audio data playing unit 1602 of the audio data playing module 1403 needs to decode, mix, and play the multi-channel remote audio data.

In this way, an audio data processing process of the audio data processing client 1400 according to this exemplary embodiment is completed.

Based on the technical solutions described above in the exemplary embodiments, the audio data processing client according to this exemplary embodiment identifies the audio data mixing manner by the setting of the local client identifier, so as to perform a compatible playing operation on the audio data of two mixing manners, that is, server mixing and client mixing, further improving the processing compatibility of the audio data of different mixing manners.

Figure 17:
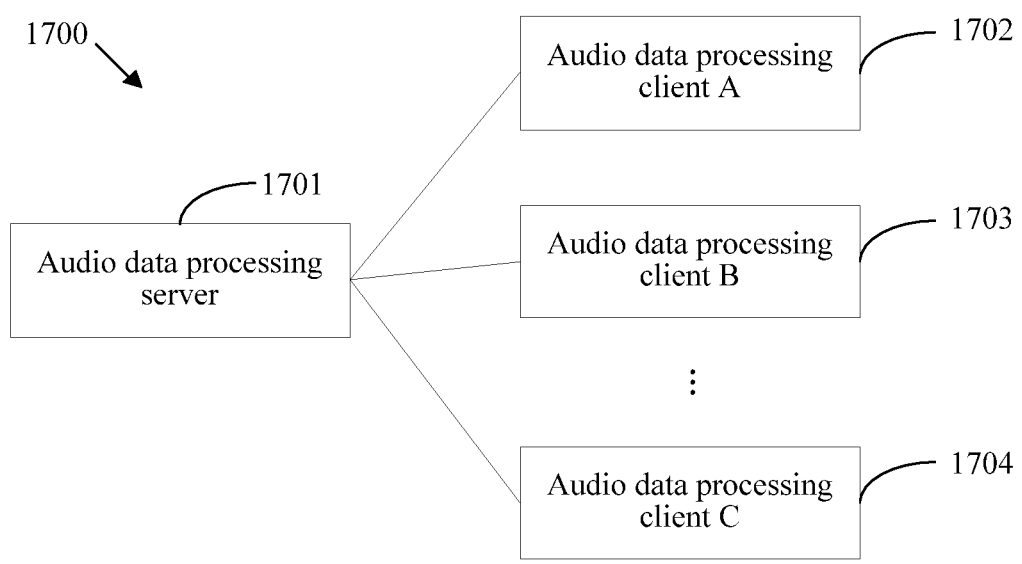
FIG. 17 is a schematic structural diagram of an audio data processing system according to an exemplary embodiment.

An exemplary embodiment further provides an audio data processing system. Referring to FIG. 17, FIG. 17 is a schematic structural diagram of an audio data processing system according to an exemplary embodiment. The audio data processing system 1700 includes an audio data processing server 1701 and a plurality of audio data processing clients 1702, 1703, and 1704.

A specific working principle of the audio data processing client is the same as or similar to the description of the foregoing audio data processing client. For details, refer to related descriptions of the foregoing audio data processing client. The audio data processing server 1701 of the audio data processing system 1700 may be a server configured to process or forward audio data in the related art technology, for example, a conversation voice server.

In the audio data processing system according to this exemplary embodiment, the audio data mixing manner is identified by using the client identifier. Therefore, a playing operation may be performed on the audio data of different mixing manners.

A specific working principle of the audio data processing system according to this exemplary embodiment is described below by using a specific example. Referring to FIG. 17, the audio data processing system in FIG. 17 includes an audio data processing server 1701 and a plurality of audio data processing clients 1702, 1703, and 1704. The audio data processing server includes a server capable of performing a mixing operation on multi-channel audio data and a server only capable of forwarding audio data.

A working flow of the audio data processing system 1700 according to this specific exemplary embodiment includes:

1. The audio data processing server 1701 receives an audio data request of an audio data processing client.

2. The audio data processing server 1701 obtains audio data of a corresponding audio data processing client according to the audio data request of the audio data processing client. For example, the audio data processing client 1702 may request audio data of both the audio data processing client 1703 and the audio data processing client 1704, and the audio data processing server 1701 obtains the audio data of the audio data processing client 1703 and the audio data processing client 1704 according to the audio data request of the audio data processing client 1702.

3. If the audio data processing server 1701 can decode, mix, and encode the audio data of the audio data processing client 1703 and the audio data processing client 1704, the audio data processing server 1701 sets a client identifier of the audio data processing client 1702 on the encoded audio data, the audio data mixing manner is server mixing.

If the audio data processing server only separately encodes and forwards the audio data of the audio data processing client 1703 and the audio data processing client 1704, the encoded audio data of the audio data processing client 1703 still has a client identifier of the audio data processing client 1703, the encoded audio data of the audio data processing client 1704 still has a client identifier of the audio data processing client 1704, and the audio data mixing manner is client mixing.

4. After the audio data processing client 1702 receives the audio data sent by the audio data processing server 1701, if the client identifier set on the audio data is the client identifier of the audio data processing client 1702, the audio data processing client 1702 determines that the mixing manner of the audio data is server mixing, and decodes and plays the audio data.

If the client identifiers set on the audio data are identifiers of the audio data processing client 1703 and the audio data processing client 1704, the audio data processing client 1702 determines that the mixing manner of the audio data is client mixing, and decodes, mixed, and plays the audio data.

In this way, an audio data processing process of the audio data processing system 1700 according to this specific exemplary embodiment is completed.

In the audio data processing method, server and system, the storage medium according to the exemplary embodiments, mixing is performed according to the audio data mixing manner of the requesting client, and audio data of different mixing manners can be compatible. In addition, in the audio data processing method, server and system according to the exemplary embodiments, the audio data mixing manner is identified by using the client identifier, so that a playing operation may be performed on audio data of different mixing manners, resolving the technical problem that in the related art, it is difficult for users using different mixing manners to converse in a same conversation system. In other words, the playing operation can be performed on audio data of different mixing manners thereby making it more easy for users using different mixing manners to converse in the same conversation system As used in the exemplary embodiments, the terms "component", "module", "system", "interface", "process", and the like are generally intended to refer to a computer-related entity: hardware, a combination of hardware and software, software, or software in execution. For example, a component may be, but is not limited to, a process running on a processor, a processor, an object, an executable application, an executed thread, a program, and/or a computer. With reference to the drawings, an application running on a controller and the controller may both be components. One or more components may be in an executed process and/or thread and the components may be located on one computer and/or distributed between or among two or more computers.

Moreover, the subject required to be protected may be implemented by using programming and/or an engineering technology to produce software, firmware, hardware, or any other combination thereof, to control a computer to perform a method, an apparatus, or an article of manufacture of the disclosed subject. The term "article of manufacture" used in the specification is intended to encompass a computer program accessible from any computer-readable device, carrier, or medium. Certainly, persons skilled in the art may be aware that modifications may be performed on the configuration without departing from the scope and spirit of the subject required to be protected.

Figure 18:
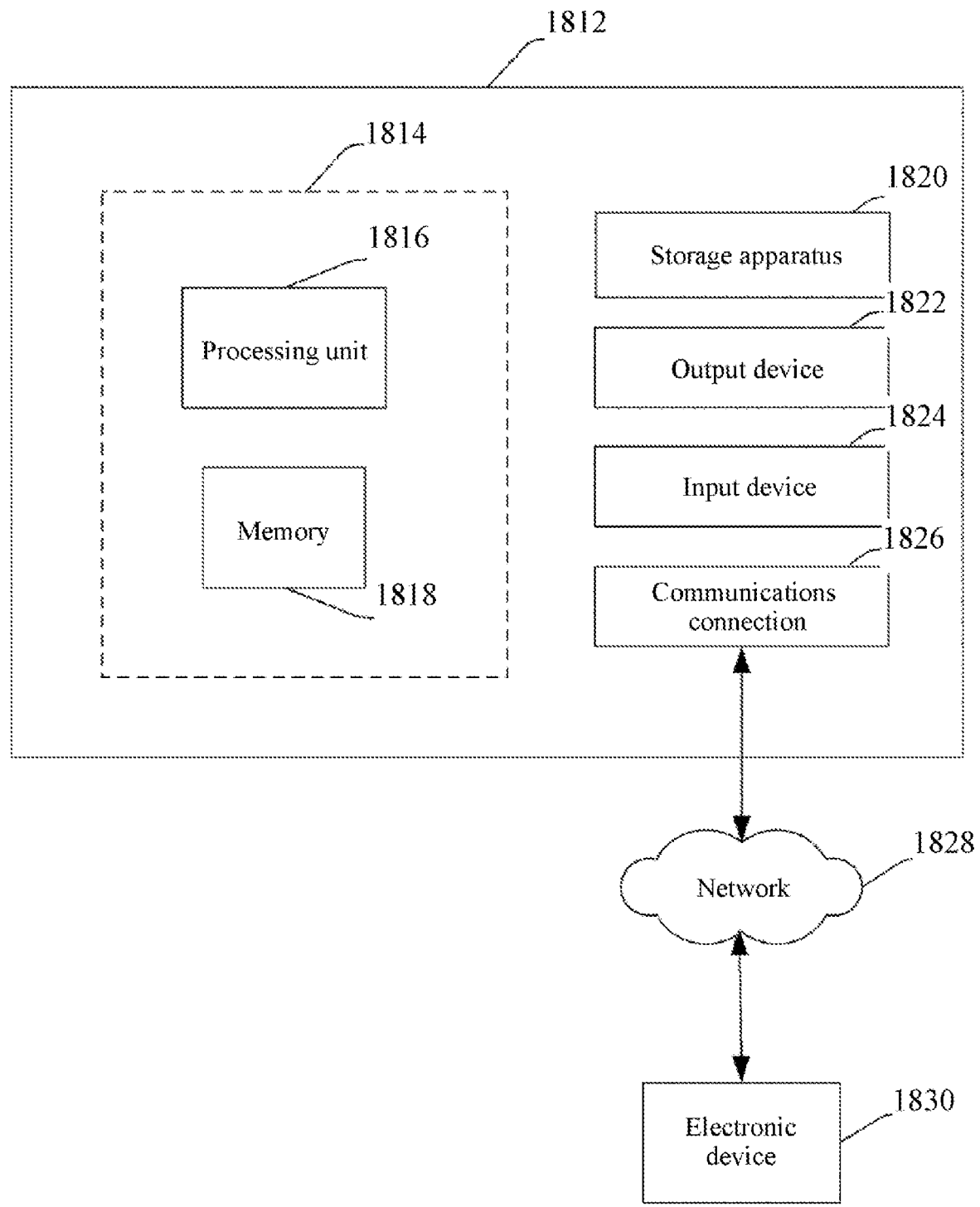
FIG. 18 is a schematic structural diagram of a working environment of an electronic device on which an audio data processing server and a client are implemented, according to an exemplary embodiment.

FIG. 18 and subsequent discussion provide a brief, short, and summarized description of a working environment of an electronic device on which the audio data processing server and/or the client of the present disclosure are implemented. The working environment of FIG. 18 is only an instance of a suitable working environment and is not intended to suggest any limitation to the scope of use or functionality of the working environment. Instances of an electronic device 1812 include, but are not limited to, a personal computer, a server computer, a handheld or laptop device, a mobile device (for example, a mobile phone, a PDA, or a media player), a multiprocessor system, a consumer electronic device, a small-size computer, a mainframe, a distributed computing environment including any of the foregoing systems or devices, and the like.

Although not required, the exemplary embodiments are described in which "computer-readable instructions" are executed by one or more electronic devices. The computer-readable instruction may be distributed by a computer-readable medium (discussed below). The computer-readable instructions may be implemented as program modules, for example, a function, an object, an application programming interface (API), or a data structure for executing a particular task or implementing a particular abstract data type. Typically, functions of the computer-readable instructions may be randomly combined or distributed in various environments.

FIG. 18 shows an instance of the electronic device 1812 according to one or more exemplary embodiments including the audio data processing server and/or the client according to the exemplary embodiments. In a configuration, the electronic device 1812 includes at least one processing unit 1816 and a memory 1818. The processing unit 1816 may be a central processing unit (CPU). Alternatively, the processing unit 1816 may be a microprocessor. According to an exact configuration and type of the electronic device, the memory 1818 may be a volatile memory (for example, a RAM), a non-volatile memory (for example, a ROM or a flash memory), or a combination thereof. The configuration is shown by a dashed line 1814 in FIG. 18.

In other exemplary embodiments, the electronic device 1812 may further include an additional features and/or functions. For example, the electronic device 1812 may further include an additional storage apparatus (for example, a removable and/or non-removable storage apparatus), which includes, but is not limited to, a magnetic storage apparatus, an optical storage apparatus, and the like. Such an additional storage apparatus is shown as a storage apparatus 1820 in FIG. 18. In an exemplary embodiment, computer-readable instructions used for implementing one or more exemplary embodiments provided in this disclosure may be stored in the storage apparatus 1820. The storage apparatus 1820 may further store other computer-readable instructions used for implementing an operating system, an application, and the like. The computer-readable instructions may be loaded in the memory 1818 and be executed by, for example, the processing unit 1816.

The term "computer-readable medium" used in this specification includes a computer storage medium. The computer storage medium includes volatile and non-volatile media, and removable and non-removable media implemented by using any method or technology used for storing information such as computer-readable instructions or other data. The memory 1818 and the storage apparatus 1820 are instances of the computer storage medium. The computer storage medium includes, but is not limited to, a RAM, a ROM, an EEPROM, a flash memory or another memory technology, a CD-ROM, a digital versatile disk (DVD) or another optical storage apparatus, a tape cartridge, a tape, a tape storage apparatus or another magnetic storage device, or any other medium that can be used for storing expected information and can be accessed by the electronic device 1812. Any computer storage medium like this may be a part of the electronic device 1812.

The electronic device 1812 may further include a communications connection 1826 that allows the electronic device 1812 to communicate with other devices. The communications connection 1826 may include, but is not limited to, a modem, a network interface card (NIC), an integrated network interface, a radio frequency transmitter/receiver, an infrared port, a USB connection, or another interface configured to connect the electronic device 1812 to other electronic devices. The communications connection 1826 may include a wired connection or a wireless connection. The communications connection 1826 may transmit and/or receive communications media.

The term "computer-readable medium" may include a communications medium. The communications medium typically includes computer-readable instructions or other data in a "modulated data signal" of, for example, a carrier or another transmission mechanism, and includes any information delivery medium. The term "modulated data signal" may include such a signal: one or more signal characteristics are set or changed by encoding information to a signal.

The electronic device 1812 may include an input device 1824, for example, a keyboard, a mouse, a pen, a voice input device, a touch input device, an infrared camera, a video input device, and/or any other input device. The device 1812 may also include an output device 1822, for example, one or more displays, a speaker, a printer, and/or any other output device. The input device 1824 and the output device 1822 may be connected to the electronic device 1812 by using a wired connection, a wireless connection, or any combination thereof. In an embodiment, an input device or an output device from another electronic device may serve as the input device 1824 or the output device 1822 of the electronic device 1812.

Components of the electronic device 1812 may be connected by using various interconnections (for example, buses). Such interconnections may include a peripheral component interconnection (PCI) (for example, a fast PCI), a universal serial bus (USB), a live line (IEEE 1394), an optical bus structure, or the like. In another embodiment, the components of the electronic device 1812 may be interconnected by using a network. For example, the memory 1818 may be composed of multiple physical memory units located at different physical locations and interconnected by using a network.

Persons skilled in the art realize that a storage device for storing computer-readable instructions may be distributed across a network. For example, an electronic device 1830 that can be accessed by using a network 1828 may store the computer-readable instructions used for implementing one or more embodiments provided by the present disclosure. The electronic device 1812 may access the electronic device 1830 and download some or all of the computer-readable instructions for execution. Alternatively, the electronic device 1812 may download multiple computer-readable instructions according to a requirement, or some instructions may be executed at the electronic device 1812 and some instructions may be executed at the electronic device 1830.

This disclosure provides various operations of exemplary embodiments. In an exemplary embodiment, the one or more operations may constitute one or more computer-readable instructions stored on a computer-readable medium, and the computer-readable instructions enable a computing device to perform the operations when the computer-readable instructions are executed by an electronic device. Describing a sequence of some or all operations shall not be interpreted as implying that the operations need to be sequentially related. Persons skilled in the art will understand an alternative sequence having the benefits of this specification. Moreover, it should be understood that not all operations necessarily exist in each exemplary embodiment provided herein.

Moreover, as used in the present disclosure, the term "or" is intended to mean an inclusive "or" and not an exclusive "or". That is, unless otherwise specified or clear from context, "X uses A or B" means any one of the natural inclusive arrangement. That is, if X uses A, X uses B, or X uses both A and B, then "X uses A or B" is satisfied in any one of the foregoing examples.

Furthermore, although the present disclosure is shown and described relative to one or more implementations, persons skilled in the art may conceive of equivalent variations and modifications based on reading and understanding of the specification and the accompany drawings. The present disclosure includes all such modifications and variations, which are only limited by the scope of the appended claims. In particular, with regard to various functions executed by the foregoing components (such as elements and resources), terms used for describing such components are intended to correspond to any component (unless indicated otherwise) for executing specified functions of the components (for example, the components are equivalent in functions), even though structures are not equivalent to the disclosed structures for executing functions in the exemplary implementations of the present disclosure shown herein. In addition, although particular features of the present disclosure are disclosed relative to only one of several implementations, the features may be combined with one or more other features of other implementations that are, for example, desirable for and advantageous to a given or particular application. Moreover, for the terms "include", "have", "contain", or variants thereof being used in the specific implementations or the claims, the terms are intended to be inclusive in a manner similar to that of the term "comprise".

Functional units in the present disclosure may be integrated in one processing module or exist as separate physical units, or two or more units are integrated in one module. The integrated module may be implemented in a form of hardware, or may be implemented in a form of a software functional module. If implemented in the form of software functional modules and sold or used as an independent product, the integrated modules may also be stored in a computer-readable storage medium. The aforementioned storage medium may be a read-only memory, a magnetic disk, or an optical disc. The foregoing apparatuses or systems can execute methods in corresponding method embodiments.

The foregoing descriptions are merely specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A server comprising:
   at least one memory configured to store computer program code; and
   at least one processor configured to access said at least one memory and operate according to the computer program code, to:
   receive audio data from a plurality of clients;
   receive an audio data request from a requesting client, the request including a desired mixing manner of the requesting client and one or more clients of the plurality of clients whose audio data is requested;
   determine, from the audio data request, the desired mixing manner of audio data requested by the requesting client from the audio data request;
   when the determined mixing manner is client mixing, only collect the audio data of the one or more clients whose audio data is requested, and send the collected audio data to the requesting client; and
   when the determined mixing manner is server mixing, preprocess the audio data by sequentially decoding, mixing, and encoding the audio data of the one or more clients whose audio data is requested, and send the preprocessed audio data to the requesting client,
   wherein the at least one processor is further configured to access the at least one memory and operate according to the computer program code, to after determining the desired mixing manner and sending the collected audio data or the preprocessed audio data to the requesting client, receive, by the server, a mixing manner conversion request from the requesting client to request a change in mixing manner that was previously set and, when the mixing manner is client mixing and the mixing manner conversion request indicates server mixing, switch the mixing manner from client mixing to server mixing and when the mixing manner is server mixing and the mixing manner conversion request indicates client mixing, switch the mixing manner from server mixing to client mixing, according to the mixing manner conversion request.

2. The server according to claim 1, wherein to preprocess the audio data, the at least one processor is further configured to access the at least one memory and operate according to the computer program code, to:
   decode audio data of all of the plurality of clients, according to a packet loss status of the audio data;
   obtain the audio data of the one or more clients whose audio data is requested, from the decoded audio data;
   convert the audio data of the one or more clients whose audio data is requested into audio data in a preset format;
   mix the audio data in the preset format; and
   compress and encode the mixed audio data according to a current network status.

3. A client comprising:
   at least one memory configured to store computer program code; and
   at least one processor configured to access said at least one memory and operate according to the computer program code, to:
   transmit, by the client having a local client identifier to a server, an audio data request for remote audio data;
   in response to the audio data request, receive, from the server, remote audio data, the remote audio data comprising a client identifier;
   obtain, by the client, the client identifier from the remote audio data;
   determine, by the client, whether the obtained client identifier is the same as or different from the local client identifier of the client that transmitted the audio data request;
   when the obtained client identifier is the same as the local client identifier, the client decodes and plays the received remote audio data without mixing the received remote audio data; and
   when the obtained client identifier is different from the local client identifier, the client decodes, mixes and plays the received remote audio data.

4. The client according to claim 3, wherein the at least one processor is further configured to access the at least one memory and operate according to the computer program code, to:
   set the local client identifier on local audio data; and
   send the local audio data to another client that is different than the client, or to another server.

5. The client according to claim 3, wherein the client identifier is set as the local client identifier on the remote audio data by the server if a mixing manner is server mixing.

6. A system comprising:
   at least one server; and
   a plurality of clients,
   wherein each of the at least one server comprises:
   at least one server memory configured to store server computer program code; and
   at least one server processor configured to access said at least one server memory and operate according to the server computer program code, to:
   receive audio data from the plurality of clients;
   receive an audio data request from a requesting client, the audio data request including a desired mixing manner of the requesting client and one or more clients of the plurality of clients whose audio data is requested;
   determine, from the audio data request, the desired mixing manner of audio data requested by the requesting client;
   when the determined mixing manner is client mixing, only collect the audio data of the one or more clients whose audio data is requested, and send the collected audio data to the requesting client; and
   when the determined mixing manner is server mixing, preprocess the audio data by sequentially decoding, mixing, and encoding the audio data of the one or more clients whose audio data is requested, and send the preprocessed audio data to the requesting client, and
   wherein each of the plurality of clients comprises:
   at least one client memory configured to store client computer program code; and
   at least one client processor configured to access said at least one client memory and operate according to the client computer program code, to:
   transmit, by the client having a local client identifier to the at least one server, the audio data request for remote audio data;
   in response to the audio data request, receive, from the at least one server, remote audio data, the remote audio data comprising a client identifier;
   obtain, by the client, the client identifier from the remote audio data;

determine, by the client, whether the obtained client identifier is the same as or different from the local client identifier of the client that transmitted the audio request, and when the obtained client identifier being is the same as the local client identifier, the client decodes and plays the received remote audio data without mixing the received remote audio data; and when the obtained client identifier is different from the local client identifier, the client decodes, mixes and plays the received remote audio data.

7. The system according to claim 6, wherein to preprocess the audio data, the at least one server processor is further configured to access the at least one server memory and operate according to the server computer program code, to:

decode audio data of all of the plurality of clients, according to a packet loss status of the audio data;

obtain the audio data of the one or more clients whose audio data is requested, from the decoded audio data;

convert the audio data of the one or more clients whose audio data is requested into audio data in a preset format;

mix the audio data in the preset format; and compress and encode the mixed audio data according to a current network status.

8. The system according to claim 6, wherein the at least one server processor is further configured to access the at least one server memory and operate according to the server computer program code, to:

receive a mixing manner conversion request of the requesting client and set the mixing manner according to the mixing manner conversion request.

9. The system according to claim 6, wherein the at least one client processor is further configured to access the at least one client memory and operate according to the client computer program code, to:

set the local client identifier on local audio data; and send the local audio data to another client that is different than the client, or to another server.

10. The system according to claim 6, wherein the client identifier is set as the local client identifier on the remote audio data by the at least one server if the mixing manner is server mixing.

* * * * *